Feb. 19, 1952     M. A. MIERAS ET AL     2,586,689
AUTOMOBILE HEATER STRUCTURE
Filed Feb. 17, 1947     3 Sheets-Sheet 1
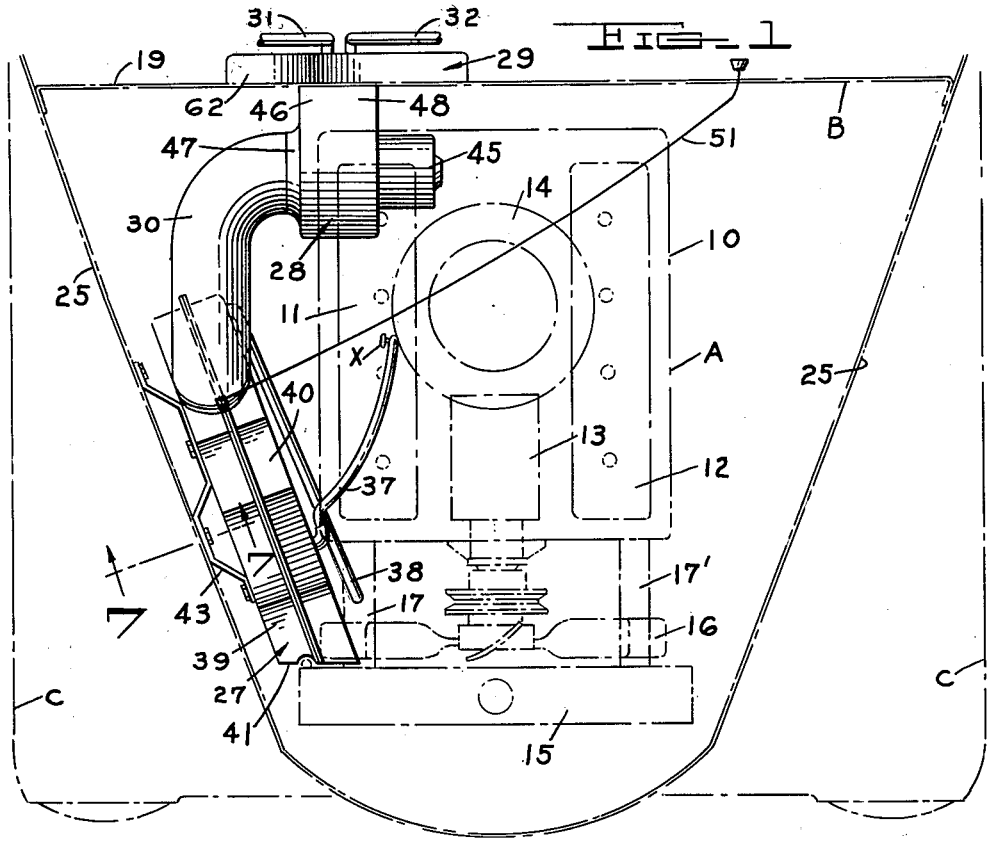
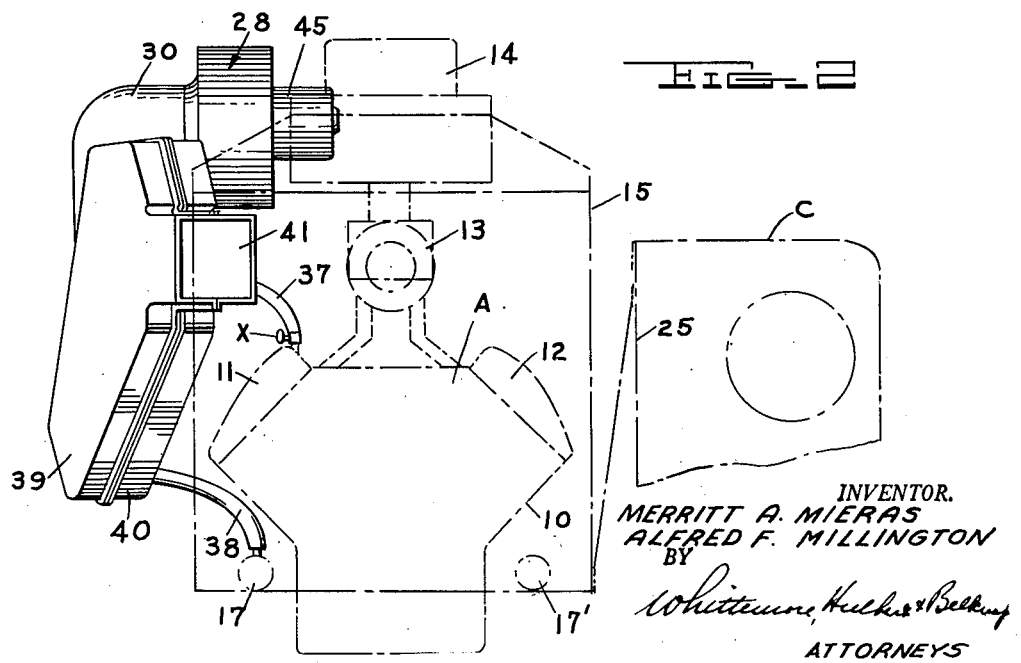
INVENTOR.
MERRITT A. MIERAS
ALFRED F. MILLINGTON
BY
ATTORNEYS Feb. 19, 1952 M. A. MIERAS ET AL 2,586,689
AUTOMOBILE HEATER STRUCTURE
Filed Feb. 17, 1947 3 Sheets-Sheet 2
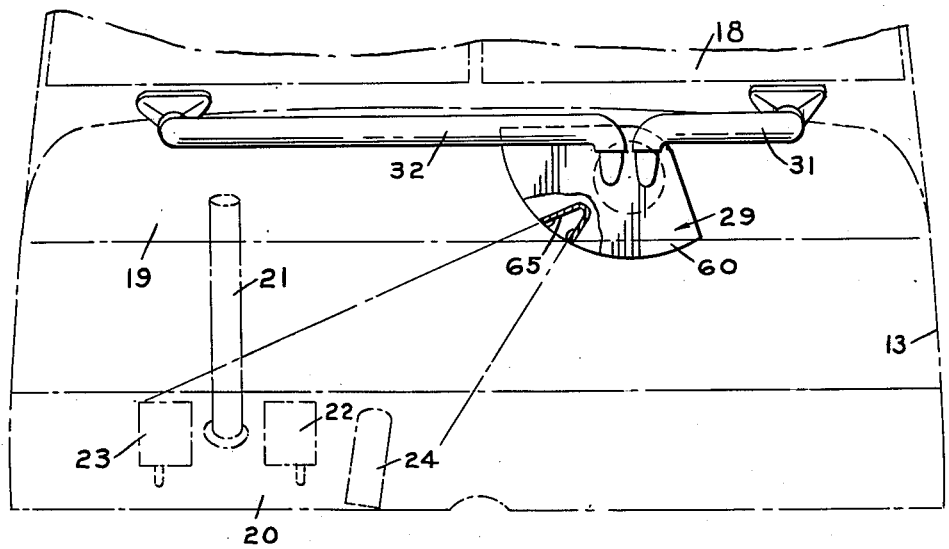
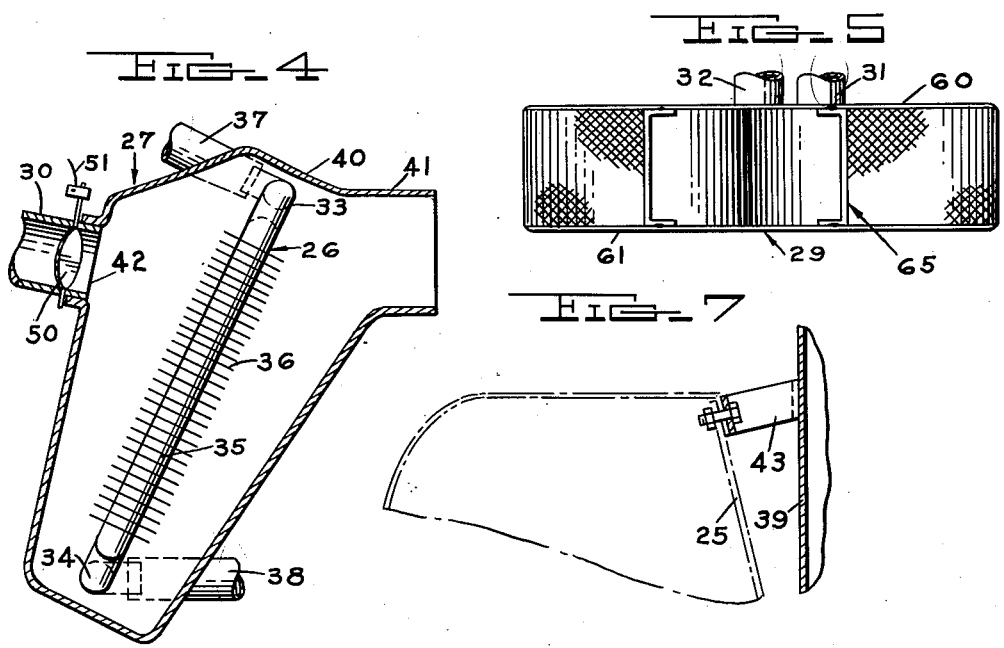
INVENTOR.
MERRITT A. MIERAS
ALFRED F. MILLINGTON
BY
Whittemore, Hulbert & Belknap
ATTORNEYS

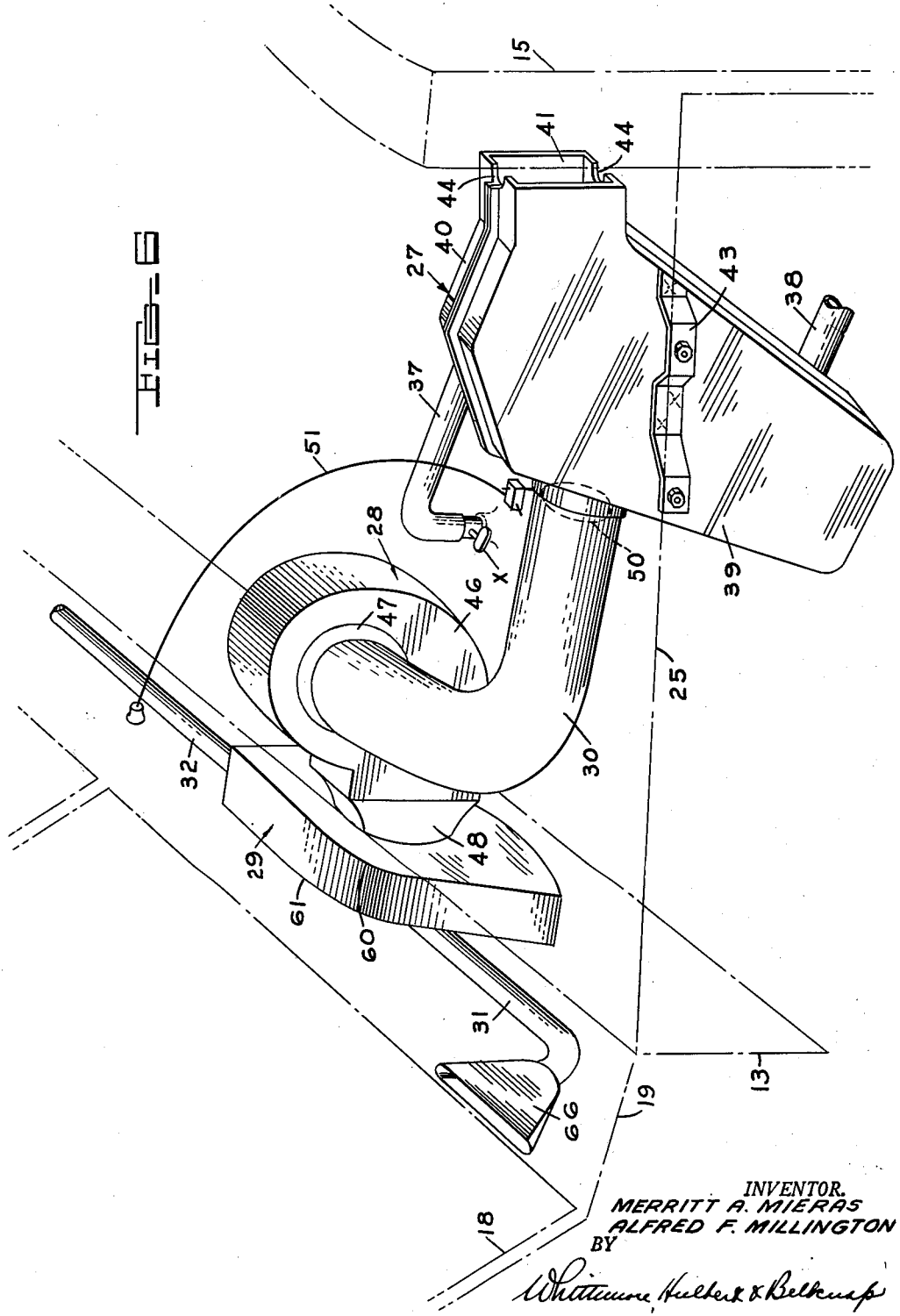

Patented Feb. 19, 1952

2,586,689

UNITED STATES PATENT OFFICE 2,586,689

AUTOMOBILE HEATER STRUCTURE

Merritt A. Mieras, Detroit, and Alfred F. Millington, Northville, Mich., assignors to Novi Equipment Company, Novi, Mich., a corporation of Michigan Application February 17, 1947, Serial No. 729,128

2 Claims. (Cl. 237—12.3)

This invention relates generally to heater structures and refers more particularly to heater installations for motor vehicles.

Heretofore it has been customary to utilize the water circulating system for the engine of a motor vehicle to heat air from the atmosphere before it was delivered by a fan or blower into the interior of the vehicle body. In many installations of this type the inlet for the air to be heated was mounted upon or supported from the rear of the radiator of the vehicle so that the entire supply of air for the inlet was received through the radiator. However, in use objectionable noises and vibrations from the radiator and/or radiator fan were picked up by said inlet and transmitted through the installation into the interior of the vehicle body. Also in such installations the heater core or heat exchange element, through which water from the engine was circulated for heating the air from the inlet, was usually within the body of the vehicle and was enclosed within a casing or shell through which the air from the inlet passed directly into the interior of the vehicle body. Thus, the core was remote to the engine and it was necessary to employ relatively long lengths of hose for conducting the water from the engine to the core and from the core to the radiator. Moreover, the construction and location of the core and enclosure therefor was such that the assembly oftentimes interfered with the leg room needed by persons occupying the front seat of the vehicle body.

In the present instance we have overcome all of the objections to the conventional installations above mentioned by locating in out of the way places beneath the hood for the vehicle engine all portions of the heater installation except the hot air register for the interior of the vehicle body and the defroster tubes for the windshield of the vehicle. Preferably the heater core is located at one side of the engine and is provided with an upright elongated box-like enclosure having adjacent its upper end a relatively short tubular air inlet that is spaced freely from and opens toward the rear as well as to one side of the radiator, so that said inlet will receive air directly from the atmosphere as well as through the radiator. Thus, vibration and noise from the radiator and/or radiator fan will not be transmitted via said inlet to the register within the vehicle body. Moreover, short lengths of hose will suffice to conduct water from the engine to the core and from the latter to the radiator.

Preferably the hot water hose from the engine to the core is connected to the upper end of the core, while the return hose is from the lower end of the core to the radiator. The hot air outlet of the box-like enclosure as well as the air inlet is at the upper end of said enclosure, consequently the greatest flow of air through the enclosure from the inlet to the outlet thereof is through and about the upper end portion of the core which is the hottest portion of the core. The remainder of the air from the inlet will flow downwardly within said enclosure about the lower portion of the core to be heated thereby and thence upwardly to the outlet mentioned. Thus, all of the air from the inlet will be heated completely by the core before it reaches the outlet.

It is also an object of the present invention to provide a heater structure wherein the hot air register has a baffle for deflecting away from the accelerator pedal of the vehicle the hot air discharged from the register. Thus the driver's foot on the accelerator pedal will not be subjected to any uncomfortable direct discharge of hot air from the register while the vehicle is in operation.

Another object is to provide a heater structure that is simple in construction, economical to manufacture, easy to install and efficient in operation.

Other objects, advantages and novel details of construction of this invention will be made more apparent as this description proceeds, especially when considered in connection with the accompanying drawings, wherein:

Fig. 1 is a top plan view of the forward end portion of a motor vehicle with the hood of the engine compartment removed and showing diagrammatically the location within the body of the vehicle of the hot air register and portions of the defroster tubes for the windshield of the vehicle;

Fig. 2 is a front elevation of the construction illustrated in Fig 1;

Fig. 3 is a diagrammatic view of the dash panel and floorboard of a vehicle body and showing the hot air register upon the dash panel;

Fig. 4 is a vertical sectional view through the upright box-like enclosure and heater core;

Fig. 5 is an enlarged fragmentary edge elevation of the register and showing the baffle within the same;

Fig. 6 is a diagrammatic view of the heater installation and showing by dot and dash lines a portion of the interior of the vehicle body to which this installation may be applied; and Fig. 7 is a sectional view taken substantially on the line 7—7 of Fig. 1.

Referring now to the drawings, A is the internal combustion engine, B is the body, and C are the front fenders of a conventional type automobile.

As shown, the engine A has a cylinder block 10 provided with heads 11 and 12 respectively, a generator 13, an air filter 14, a radiator 15, a fan 16 for the radiator, and tubes 17 and 17' for water extending between the cylinder block 10 and the radiator 15.

The body B has a windshield 18 and a dash panel 19 and is provided below said panel with a floor-board 20 through which the usual steering column 21, brake pedal 22, clutch pedal 23 and accelerator pedal 24 extend.

The front fenders C are rigid with the side walls 25 of the engine compartment and project laterally outward therefrom in the usual manner.

The heater installation embodying our invention comprises a heater core or heat exchange element 26, an upright elongated box-like enclosure or casing 27 therefor, an electrically operated blower 28, a hot air register 29, a tube 30 for conducting hot air from the enclosure 27 to the blower 28, and tubes 31 and 32 for defrosting the windshield 18 of the motor vehicle.

As shown, the heater core 26 has upper and lower headers 33 and 34 respectively and tubing 35 extending between said headers and provided with radiating fins 36. A hose 37 conducts hot water from the head 11 of the engine block to the upper header 33 of the core, while another hose 38 conducts water from the lower header 34 to the tube 17 that extends between the cylinder block 10 and the radiator 15. Thus, the core 26 is heated from top to bottom by hot water from the engine of the motor vehicle. If desired, a valve X may be included in the hose 37 adjacent the point where it is connected to the head 11 of the engine to control the flow of hot water from the engine through said hose to the core 26. Thus, in the summertime or during warm weather the valve X may be closed so that the supply of hot water from the engine to the core 26 will be cut off.

The enclosure 27 is preferably made of two sheet metal stampings 39 and 40 suitably secured together and has adjacent its upper end a tubular air inlet 41 and a tubular air outlet 42. Preferably the enclosure 27 carries the core 26 and is supported at one side of the engine A by means of a bracket 43 rigidly secured to the adjacent fender C and side wall 25 of the engine compartment.

The air inlet 41 is spaced freely from and opens toward the rear as well as to one side of the radiator 15 so that said inlet will receive air directly from the atmosphere as well as through the radiator. Thus, vibration and noise from the radiator 15 and/or fan 16 will not be transmitted via the inlet to the register 29 within the vehicle body. If desired, the air inlet 41 may be provided with vertically aligned openings 44 for receiving and providing clearance for the usual overflow pipe (not shown) for the radiator 15.

The air outlet 42 of the enclosure 27 is substantially in horizontal alignment with the inlet 41, hence the greatest flow of air through the enclosure 27 from the inlet 41 to the outlet 42 is through and about the upper end portion of the core 26 which is the hottest portion of said core. The remainder of the air from the inlet 41 will flow downwardly within the enclosure 27 about the lower portion of the core 26 to be heated thereby and thence upwardly to the outlet 42. Thus, all of the air from the inlet 41 will be heated completely by the core 26 before it reaches the outlet 42.

The blower 28 is preferably of the centrifugal type and may be operated by any suitable electric motor 45. Such blower 28 has a housing 46 supported upon the outer side of the dash panel 19 of the vehicle and is provided with an air inlet 47 and an air outlet 48. The inlet 47 is connected to the tube 30 leading from the outlet 42 of the box-like enclosure 27, while the outlet 48 extends through the dash panel 19 to the hot air register 29 upon the inner side of said panel. Any suitable means such as an electric switch (not shown) in circuit with the electrical wiring system of the motor vehicle may be used to control the operation of the blower 28, while any suitable valve such as the butterfly valve 50 in the tube 30 and controlled by a pull wire 51 from the dash panel 19 or instrument panel (not shown) of the vehicle may be used to control the flow of the heated air from the enclosure 27 to the blower 28 and register 29. Ordinarily when the vehicle is traveling at 30 miles per hour or faster, it is unnecessary to use the blower 28 because the impact of air through the heater installation is sufficient to create the proper circulation of heated air. However, the blower can advantageously be used when the vehicle is traveling at slower speeds or in traffic to effect the desired flow of air through the installation. In the summertime or during warm weather when the valve X is closed to cut off the supply of hot water from the engine to the core 26, the blower 28 may be operated to cause a circulation of air through the installation for cooling purposes.

The register 29 lies substantially flat against the inner side of the dash panel 19 and opens downwardly and horizontally. Preferably the register has parallel side walls 60 and 61 respectively and a top wall 62. The side walls 60 and 61 have inverted substantially L-shaped upper edges and have arcuate lower edges, while the top wall 62 extends along and closes the space between the inverted L-shaped upper edges of said walls. Between said side walls 60 and 61 at the arcuate edges thereof is a baffle 65 of inverted V configuration for deflecting away from the accelerator pedal 24 of the vehicle the hot air discharged from the register 29. Thus, the driver's foot on the accelerator pedal 24 will not be subjected to any uncomfortable direct discharge of hot air from the register 29 while the vehicle is in operation.

The tubes 31 and 32 for defrosting the windshield extend outward and upward from the outer wall 60 of the register and have upwardly flaring outlets 66 that are fastened by suitable securing elements (not shown) to the lower inside edge portion of the windshield 18 so that hot air discharged from said outlets will flow upwardly over the inner surface of the windshield to defrost the same.

What we claim as our invention is:

1. A heater structure for use with a motor vehicle, comprising a register upon the dash panel of the vehicle and opening downwardly over a wide arc including the accelerator pedal of said vehicle, means for supplying heated air to said register, and an inverted substantially V-shaped baffle rigidly mounted within said opening for deflecting heated air away from said accelerator pedal as it is discharged from said opening so that the driver's foot on said pedal will not be subjected to any uncomfortable direct discharge of heated air from said register.

2. A heater installation for a motor vehicle having a dash panel, an engine compartment, and an internal combustion engine within the said compartment and provided adjacent the forward end of said compartment with an upright radiator; comprising an upright elongated box-like casing within said compartment immediately in rear of said radiator and supported from an upright side wall of said compartment, a wall of said casing adjacent said upright radiator having a single horizontal inlet for air opening toward and adapted to receive air directly from said radiator, another wall of said casing having an outlet for air, an elongated hot water heating element within and extending longitudinally of said upright casing, means for conducting hot water from said engine to the upper end of said hot water heating element, means for conducting water from the lower end of said heating element to said radiator, the arrangement of said two conducting means relative to said heating element being such that said heating element is heated from top to bottom thereof by hot water from the engine, the air inlet and air outlet aforesaid of said casing being upon opposite sides of said heating element adjacent the heated upper end thereof whereby air flowing in said casing from said inlet to said outlet will engage and be heated by the heated upper end of said heating element, a hot air register disposed flat against the inner side of said dash panel and having a downwardly opening outlet for heated air, means for conducting heated air from the outlet of said casing to said register, including a blower supported upon the outer side of said dash panel, and an inverted substantially V-shaped deflector rigidly mounted within the outlet of said register for preventing heated air from being discharged toward a predetermined part of said vehicle.

MERRITT A. MIERAS.
ALFRED F. MILLINGTON.

REFERENCES CITED

The following references are of record in the file of this patent:

UNITED STATES PATENTS

| Number | Name | Date |
|---|---|---|
| 2,146,845 | Payne | Feb. 14, 1939 |
| 2,177,870 | Deitz | Oct. 31, 1939 |
| 2,228,550 | Young | Jan. 14, 1941 |
| 2,264,945 | Le Fevre | Dec. 2, 1941 |
| 2,308,887 | McCollum | Jan. 19, 1943 |
| 2,430,759 | Crise | Nov. 11, 1947 |